US012073460B2

(12) United States Patent
Figueroa-Ramirez et al.

(10) Patent No.: US 12,073,460 B2
(45) Date of Patent: Aug. 27, 2024

(54) DYNAMIC PURCHASING POWER VISUALIZATION

(71) Applicant: Capital One Services, LLC, McLean, VA (US)

(72) Inventors: Martin Figueroa-Ramirez, Silver Spring, MD (US); Jennifer Kwok, Brooklyn, NY (US); Susan Hogan Davis, Alexandria, VA (US); Tara Ann Hickey, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/973,223

(22) Filed: Oct. 25, 2022

(65) Prior Publication Data

US 2024/0135442 A1 Apr. 25, 2024
US 2024/0232895 A9 Jul. 11, 2024

(51) Int. Cl.
*G06Q 40/03* (2023.01)
*G06Q 20/40* (2012.01)
*G06T 19/00* (2011.01)

(52) U.S. Cl.
CPC .......... *G06Q 40/03* (2023.01); *G06Q 20/405* (2013.01); *G06T 19/006* (2013.01)

(58) Field of Classification Search
None
See application file for complete search history.

(56) References Cited

U.S. PATENT DOCUMENTS

| 10,445,715 | B2 | 10/2019 | Granbery et al. |
| 10,614,448 | B2 | 4/2020 | Carpenter et al. |
| 10,692,140 | B1 | 6/2020 | Kim et al. |
| 2018/0150831 | A1* | 5/2018 | Dolan .................. G06Q 20/321 |
| 2019/0295064 | A1 | 9/2019 | Malo |
| 2020/0105064 | A1* | 4/2020 | Gulersen ................ G06F 3/011 |

FOREIGN PATENT DOCUMENTS

WO 2019106690 6/2019

* cited by examiner

*Primary Examiner* — Joseph W. King
(74) *Attorney, Agent, or Firm* — Foley & Lardner LLP

(57) ABSTRACT

Disclosed embodiments pertain to determining and communicating purchasing power through a visualization. A trained machine learning model can be invoked on a credit card without a preset limit to predict a dynamic spending limit based on credit card data or credit score data. Purchasing power can be computed as the difference between the dynamic spending limit and a current balance, and a purchase power class can be determined based on the purchasing power. Further, a graphic representation of a purchasing power class can be determined. Subsequently, presentation of the graphic representation can be triggered in a manner that overlays the graphic representation on or around the physical card.

20 Claims, 9 Drawing Sheets

DYNAMIC PURCHASING POWER VISUALIZATION

BACKGROUND

Electronic transactions, such as payment for goods and services, can be facilitated with physical payment cards. A payment card can be presented at a point-of-sale terminal, which acquires payment card details from the card. Subsequently, the details are sent to the merchant or acquiring bank or processor through a network. The acquiring bank or processor forwards the details to a payment card network, which requests payment authorization from an issuing bank of the payment card. If funds are available, the issuing bank can send an approval code through the payment card and acquiring bank networks to the merchant. Subsequently, the merchant can send the approval code through the networks, which results in a debit from an issuing bank account and a credit to a merchant or acquiring bank account.

Traditional payment cards include preset spending limits. The spending limit can be a specific amount corresponding to a line of credit extended by a financial institution to the cardholder from which the cardholder can borrow money to pay a merchant. For example, the spending limit can be five thousand dollars. However, some payment cards include no preset limit, which provides flexibility in the cardholder's spending capacity.

SUMMARY

The following presents a simplified summary to provide a basic understanding of some aspects of the disclosed subject matter. This summary is not an extensive overview. It is not intended to identify necessary elements or delineate the scope of the claimed subject matter. Rather, this summary presents some concepts in a simplified form as a prelude to the more detailed description presented later.

Briefly described, disclosed aspects relate to automatically determining and visualizing dynamic purchase power. A machine learning model can be trained and invoked to infer a dynamic spending limit based on credit report data and credit card account data, among other things. Purchasing power can be computed as the difference between the dynamic spending limit and any outstanding balance. The purchasing power can subsequently be classified into one of a plurality of classes or categories based on the purchasing power and predetermined class thresholds. A graphic representation can be generated or selected that captures the purchasing power class visually. The graphic representation can subsequently be conveyed to a computing device for presentation. In one particular instance, the graphic representation can be presented in augmented reality on or near the corresponding physical credit card. In one instance, additional information or recommendations can be presented alone or in conjunction with the graphic representation.

According to one aspect, disclosed embodiments can include a system that comprises a processor coupled to a memory that includes instructions that, when executed by the processor, cause the processor to invoke a machine learning model on a credit card without a preset spending limit, wherein the machine learning model is trained to predict a dynamic spending limit based on one or more of credit card data or credit report data, compute purchasing power as a difference between the dynamic spending limit and a current balance, identify a purchasing power class based on the purchasing power, determine a graphic representation associated with the purchasing power class, and trigger presentation of the graphic representation in augmented reality overlaid on a physical credit card associated with the credit card account. The instructions can also cause the processor to trigger the presentation of at least a subset of credit report data. Further, the instructions can cause the processor to determine a location of a user of the credit card, identify a purchase context given the location, and classify the purchasing power based on the purchase context. Additionally, the instructions can cause the processor to determine an average cost of a product or service given the purchase context, compute an impact of a purchase of the average cost on the credit report data, and trigger the presentation of the impact with the graphical representation on the physical card. The instructions can further cause the processor to infer an event with the machine learning model given transaction history and classify the purchasing power based on the event. The instructions can also cause the processor to trigger display of the event, in one instance. Further, the instructions can cause the processor to analyze one or more factors associated with the purchasing power classification, determine a change to the one or more factors that increases purchasing power, and trigger display of a message including the change as a recommendation. In one instance, the instructions can cause the processor to trigger presentation by augmented reality glasses. In one scenario, the graphic representation can correspond to a traffic light with green, yellow, and red colors corresponding to distinct purchasing power classifications. In another scenario, the graphic representation can be a bar graph.

In accordance with another aspect, disclosed embodiments can include a method comprising executing, on a processor, instructions that cause the processor to perform operations. The operations invoking a machine learning model trained to infer a dynamic spending limit for an input credit card with no preset spending limit based on credit card data and credit score data, computing purchasing power as the difference between the dynamic spending limit and credit card balance, identifying a purchasing power class from amongst a plurality of classes based on the purchasing power, configuring a graphic representation based on the purchasing power class, and triggering presentation of the graphic representation in augmented reality overlaid on the credit card. The operations can further comprise determining a credit card user's location, identifying a purchase context given the location, and adjusting the purchasing power based on the purchase context. Further, the operations can comprise determining an average cost of a product or service given the purchase context, computing an impact of a purchase of the average cost on the credit score data, and triggering the presentation of the impact with the graphical representation on the credit card. Additionally, the operations can comprise inferring an event with the machine learning model given transaction history and adjusting the purchasing power based on the event. Further, the operations can comprise analyzing one or more factors associated with the purchasing power classification, determining a change to the one or more factors that increases purchasing power, and triggering display of a message including the change as a recommendation. Furthermore, configuring the graphic representation can correspond to one of activating one of green, yellow, or red on a traffic light based on thresholds associated with the purchasing power, in one instance.

According to yet another aspect, disclosed embodiments can include a computer-implemented method. The method comprises receiving identifying data of a credit card with no preset spending limit as input, executing a machine learning model trained to infer a dynamic spending limit based on credit card data and credit score, determining purchasing power based on the difference between the dynamic spending limit and an outstanding balance, assigning the purchasing power to one of a plurality of categories based on predetermined category thresholds, generating a graphic representation identifying an assigned category, and triggering presentation of the graphic representation to a user on a user computing device. The computer-implemented method can further comprise triggering presentation in augmented reality overlaid on the credit card. Further, the method can comprise determining a location of a user of the credit card, identifying a purchase context given the location, and adjusting the purchasing power based on the purchase context. Furthermore, the computer-implemented method can comprise analyzing one or more factors associated with the purchasing power classification, determining a change to the one or more factors that increases purchasing power, and triggering display of a message including the change as a recommendation.

To accomplish the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Cardholders seek to understand their purchasing power vis-a-vis payment cards. For some payment cards, a cardholder can track purchases and compare the total purchases to a spending limit to determine the available credit. Understanding the purchasing power of a card with no preset spending limit (NPSL) is more difficult. The fact that a card has no preset spending limit does not mean there is no spending limit. Rather, the spending limit can dynamically change based on numerous factors, such as purchase and payment history, as well as credit history, among other things. As a result, a cardholder does not know the exact credit limit and thus purchasing power, which can be embarrassing if purchases are declined.

Disclosed embodiments pertain to dynamic purchasing power determination and visualization. Purchasing power corresponds to available credit, which is the difference between a credit limit and the current balance. However, the credit limit for an NPSL card is dynamic and can be determined or inferred at a given time. The credit limit can be based on credit card data, such as past transactions and payment history, as well as credit report information, among other things. The credit limit can be determined or inferred based on one or more factors, and purchase power can be computed as a function of the credit limit. The purchase power can be classified or categorized as one of a plurality of classes, categories, or levels. These classes can correspond to a visualization that can be presented to a user in several ways, including an augmented reality graphic projected on or near the physical credit card. Additional information or recommendations can also be determined and presented alone or in conjunction with a purchasing power visualization.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
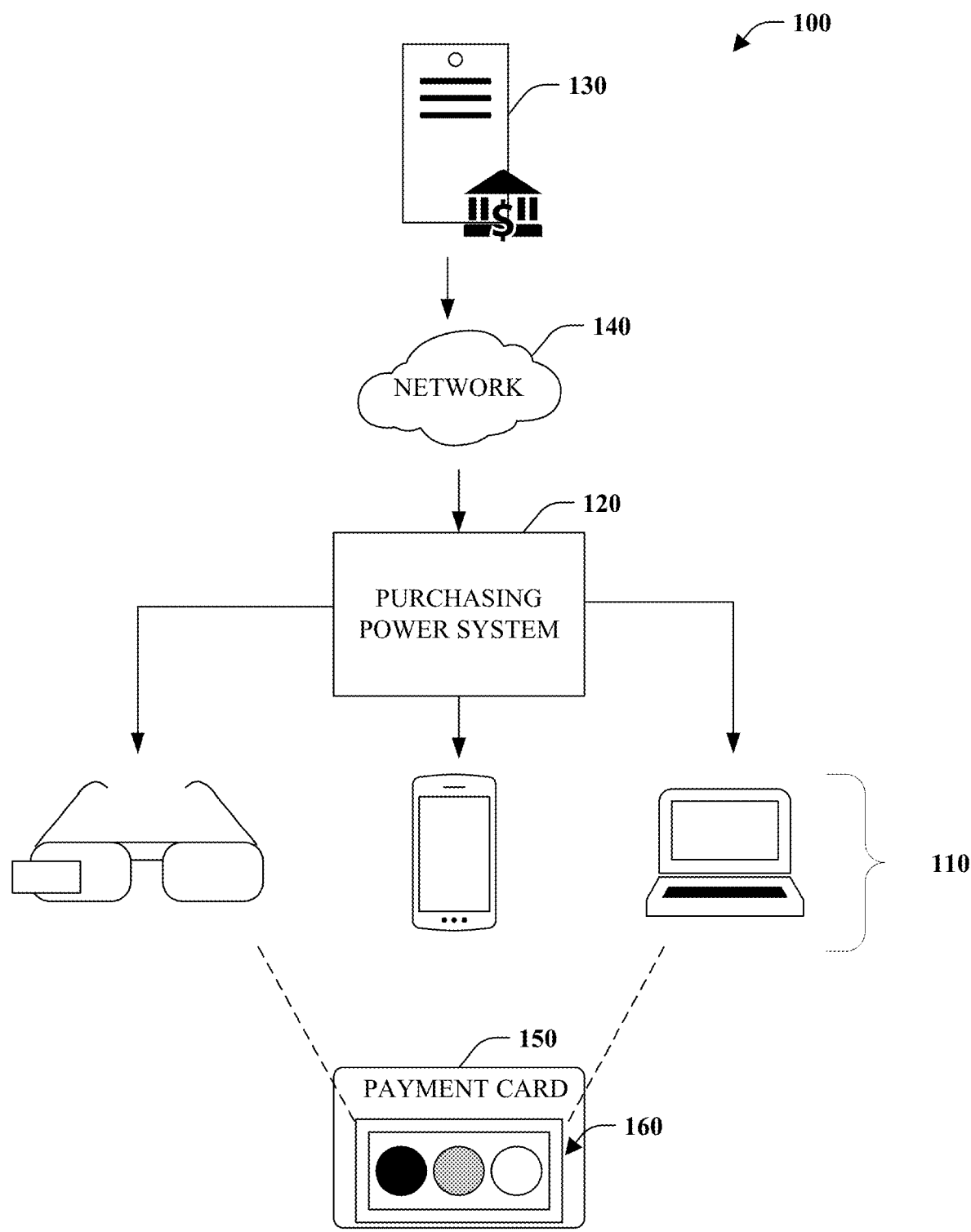
FIG. 1 illustrates an overview of an example implementation.

Referring initially to FIG. 1, a high-level overview of an example implementation 100 is depicted. The implementation 100 includes a computing device 110, purchasing power system 120, server 130, network 140, payment card 150, and visualization 160. The computing device 110 can include augmented reality glasses, a smartphone, a laptop, or another processor-based device.

The purchasing power system 120 is configured to determine or infer purchasing power and generate the visualization 160 for presentation by a display of the computing device 110. The purchasing power system 120 be loaded on and executed by the computing device. Alternatively, all or a portion of the purchasing power system 120 can be a network-accessible service that can be executed on one or more remote servers and provide a result corresponding to a given input.

Regardless of the implementation, the purchasing power system 120 can interface with one or more servers 130 over a network 140. The servers can correspond to one or more database systems that store financial data including transaction and payment history, among other things. The server 130 can also provide credit score or location data, including local merchants, goods or services, and prices. The network 140 can correspond to the Internet or another wide area or local area communication network, among other things.

The payment card 150 can include any mechanism to facilitate electronic payment. Accordingly, the payment card 150 can correspond to a credit card, debit card, or gift card, among other things. In accordance with one embodiment, the payment card 150 can correspond to a credit card with no preset spending limit. The payment card 150 can include an account number, expiration date, security code, and cardholder name, among other things. A user can enter such information into a computing device 110, or the computing device 110 can utilize computer vision technology, such as optical character recognition, to automatically determine the information.

The purchasing power system 120 can receive the payment card information as input. The purchasing power system 120 can utilize the information to determine or infer a credit limit for the payment card 150. The credit limit is dynamic for a card with no preset spending limit. The dynamic credit limit can be determined or inferred based on current data and information such as outstanding balance, payment history (e.g., timely, late), transaction history, credit report, and credit score, among other things. Purchasing power can be computed as the difference between the credit limit and any outstanding balance. The purchasing power can then be classified into two or more classes or categories, such as "excellent," "good," "fair," "poor," and "bad."

A visualization 160 can be generated or selected that reflects a determined purchasing power class and provided for rendering on a display of a computing device 110. The example visualization 160 illustrated is a traffic light graphic with green, yellow, and red lights. The green light can correspond to an excellent or good class. The yellow light can capture a fair or average class, and the red can correspond to a bad or poor class.

In accordance with one implementation, the visualization 160 can be projected onto the payment card 150. For example, the payment card 150 can be detected utilizing augmented reality glasses or a smartphone, and the visualization 160 can be displayed on, over, or near the payment card 150. In another instance, a computing device such as a smartphone or laptop can display a visual image of the payment card 150 with the visualization projected on or near the payment card 150.

Although not illustrated, the visualization 160 can include additional information beyond or related to purchasing power. For instance, the visualization can also include the user's credit score. Additional content can include a recommendation or other message about how purchasing power, a credit score, or both can be improved, for example, by making a payment.

Figure 2:
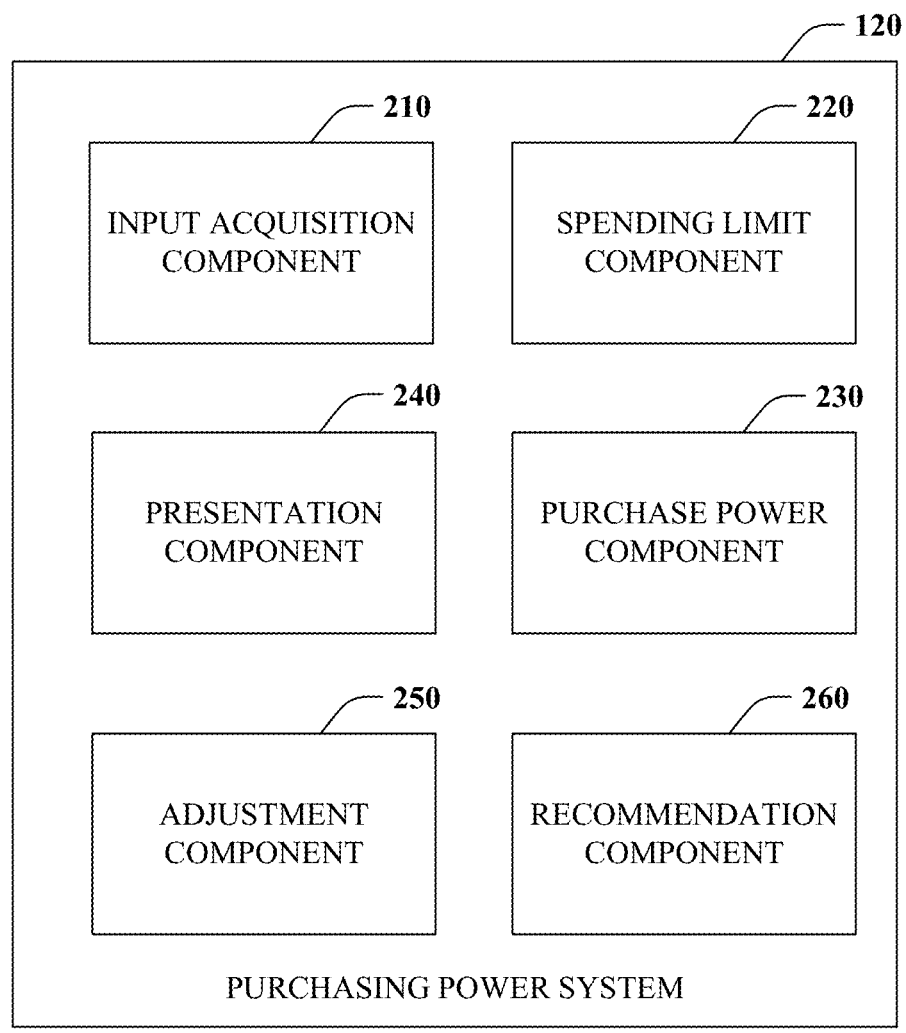
FIG. 2 is a block diagram of an example purchasing power system.

FIG. 2 is a block diagram of an example purchasing power system 120 in further detail. The purchasing power system 120 includes input acquisition component 210, spending limit component 220, purchase power component 230, presentation component 240, adjustment component 250, and recommendation component 260. These components can be implemented by a processor coupled to a memory that stores instructions that cause the processor to perform the functionality of each component when executed. Consequently, a computing device can be configured as a special-purpose device or appliance that implements the functionality of the purchasing power system 120. Further, all or portions of the purchase power system 120 can be distributed across computing devices or made accessible by way of a network service.

The input acquisition component 210 is operable to receive, retrieve, or otherwise obtain or acquire data from one or more sources for use by the purchasing power system 120. In one instance, the input acquisition component 210 can acquire payment card information, including account number, cardholder name, expiration date, and security code. The payment card information can be manually inputted or automatically acquired utilizing computer vision technology, such as optical character recognition. Further, the input acquisition component 210 can request and receive data such as outstanding balance, transactions, and payment history associated with a financial account of a payment card.

The spending limit component 220 is operable to determine or infer a static or dynamic spending limit for a payment card. The spending limit component 220 can interface with the input acquisition component 210 to acquire data for computing a spending limit, including payment history, past transactions, and credit report or score data. The acquired data can be analyzed and used to determine a spending limit. For example, if an account averages about twenty thousand dollars in monthly transactions and pays on time, the spending limit can be thirty-five thousand dollars. By contrast, the spending limit could be twenty-five thousand dollars if the same account has a history of late payments or a poor credit rating. In one implementation, the spending limit component 220 can be independent of a financial institution system that determines such limits. Alternatively, the spending limit component 220 can correspond to a component or system utilized by a financial institution to determine whether to permit or reject a transaction amount.

The purchase power component 230 is configured to determine purchasing power based on a result of the spending limit component 220. The spending limit component can return a static or dynamic spending limit. The purchasing power component 230 can acquire an outstanding balance and reduce the spending limit by the outstanding balance, if there is an outstanding balance, to produce a numeric value representing purchasing power. Purchasing power can next be classified into a class or bucket based on the numeric value and predetermined thresholds associated with each of two or more classes. The classes can be "good" and "bad" or "excellent," "good," "poor," and "bad," as examples.

The presentation component 240 generates or selects a graphic representing an individual's purchasing power, as determined by the purchase power component 230. The graphic can depend on the number of classes and the particular class to be identified. For example, if there are three classes such as "good", "average," and "bad," a traffic light graphic can be employed with a light corresponding to purchasing power illuminated. The graphic can also be a gauge with a needle pointing to a portion that captures the purchasing power class. Of course, the graphic is not limited to being a traffic light or gauge. Substantially any graphic can be employed to capture the purchasing power including a graph or color gradient, among other things.

The adjustment component 250 is configured to adjust or alter the purchasing power based on additional available context data. In one instance, the context data can correspond to a location at or near a store. For example, the location of a computing device can be determined based on a positioning system such as a global positioning system (GPS). Based on the position or location, a store can be identified that sells goods or services. The cost of the goods and services can be determined or inferred, and the purchasing power can be adjusted to reflect purchasing power associated with nearby stores. If the store is a car dealership, the purchasing power can be reduced to indicate that the purchasing power is not sufficient to purchase a car.

In another instance, the context can correspond to an event. The event can be personal or business related, such as the achievement of a milestone (e.g., number of years in business, income change). Another event can correspond to a holiday or situation significantly affecting business. Other events are also possible and contemplated. The adjustment can be an increase or decrease in purchasing power based on the event. For example, purchasing power can be increased if a milestone has been achieved. Alternatively, if the event results in the closing of a business or a significant reduction of business, the purchasing power can be decreased.

The recommendation component 260 is operable to determine and present recommendations or suggestions alone or in conjunction with the purchasing power. In one scenario, the recommendation can pertain to increasing purchasing power. For example, the recommendation component 260 can receive payment information including any past due amount and outstanding balance, and recommend submitting a payment to increase purchasing power. The recommendation component 260 can also recommend paying down another account balance to improve a credit score and thus purchasing power. In another scenario, the recommendation component 260 can be concerned with an individual's credit report and make recommendations for or against purchases based on credit report impact. Alternatively, the recommendation component 260 can determine and disclose the impact a potential purchase can have on a credit report and score.

Figure 3:
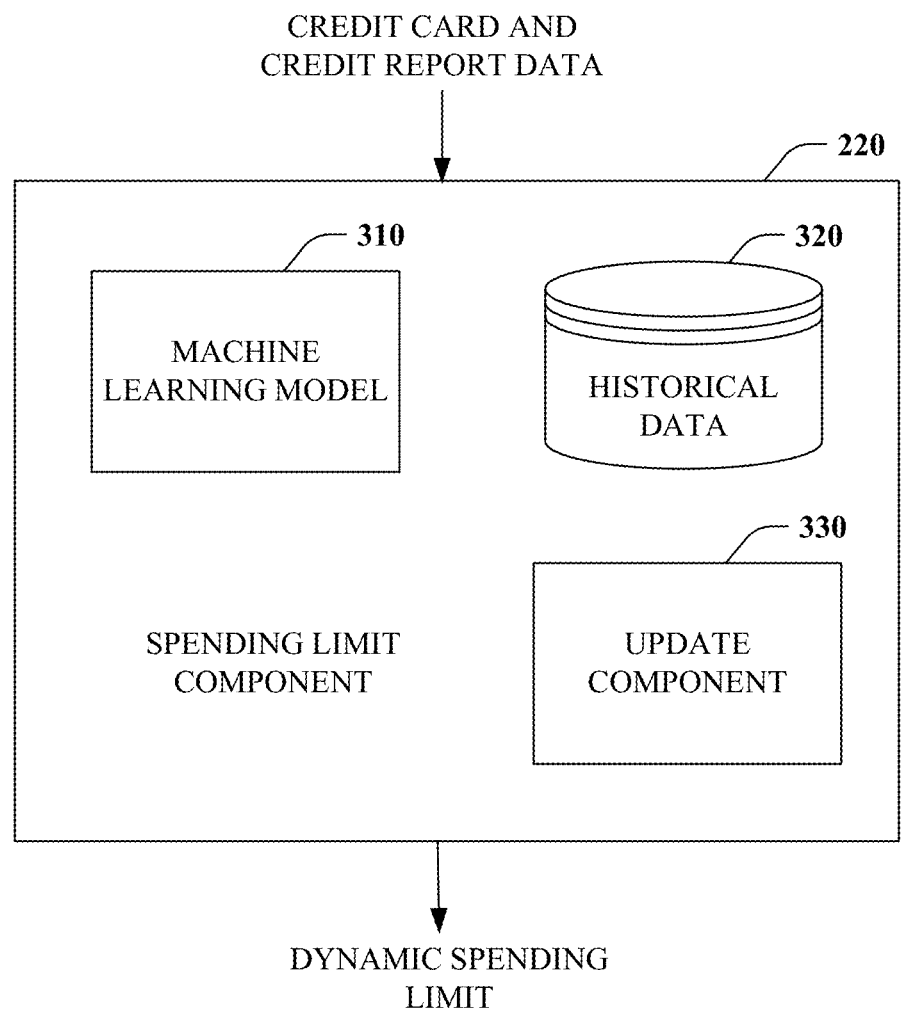
FIG. 3 is a block diagram of an example spending limit component.

Turning attention to FIG. 3, an example spending limit component 210 is illustrated in further detail. The spending limit component 220 is operable to infer the spending limit for a payment card with no preset spending limits. The spending limit component 220 includes a machine learning model 310, historical data 320, and update component 330.

The machine learning model 310 is a mechanism that can recognize patterns and make predictions given previously unseen data. In one instance, the machine learning model can be a supervised learning model (e.g., regression, decision tree, random forest, classification (e.g., naive Bayes, support vector machine), deep learning) that is trained with the historical data 320. The historical data can include account holder demographic data, or in other words, background characteristics of an account holder, such as age, gender, ethnicity, income, and employment status, among other things. Additionally, the historical data can comprise manually or automatically specified spending limits or categories associated with the account holder, which seeks to balance fund availability with risk of loss. Further, the historical data 320 can comprise information regarding default or late payments. The machine learning model 310 can be generated or trained based on such information. The machine learning model 310 can receive previously unseen account holder data as input and return a spending limit or class based on the account holder data as output.

The update component 330 is configured to trigger an update of the machine learning model 310. The update component 330 retrains the model based on additional data that can be added to the historical data 320. Retraining can be performed periodically or in near real-time based on a reinforcement learning technique that seeks to optimize results. For example, the machine learning model 310 can be updated or retrained monthly, quarterly, or yearly. Further, the update component can support manual intervention to trigger an update. For instance, retraining can be manually triggered if data becomes available about another feature or characteristic of an account holder. Furthermore, the machine learning model 310 can be updated based on current late payments or defaults with respect to other account holders.

Figure 4:
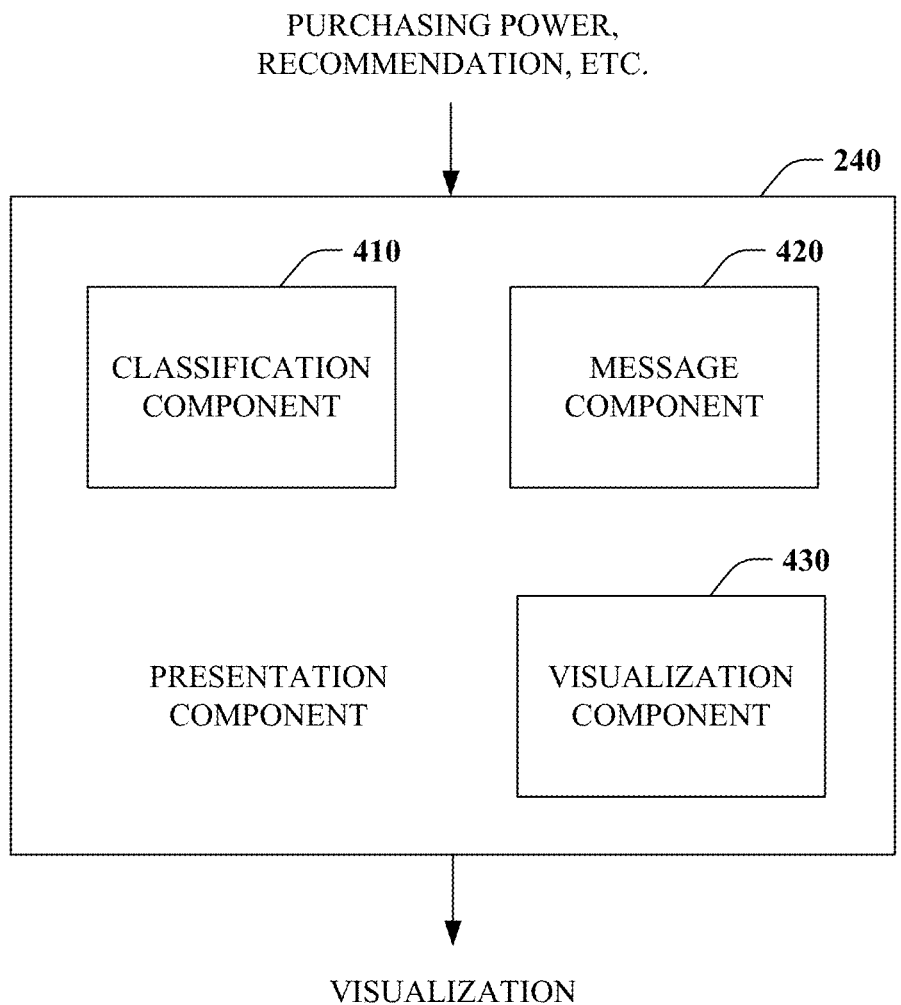
FIG. 4 is a block diagram of an example presentation component.

FIG. 4 is a detailed block diagram of an example presentation component 240. The presentation component 240 receives, retrieves, or otherwise obtains or acquires input data such as purchasing power or a recommendation, among other things, and outputs a visualization for display by a display device such as augmented reality glasses. The presentation component 240 includes several components or subcomponents, including classification component 410, message component 420, and visualization component 430.

The classification component 410 is configured to convert a numeric value of purchasing power into a class or category if such a class or category is not provided as input. A plurality of classes can be provided with associated thresholds such as excellent, good, fair, poor, bad, or the like. The classes can represent the magnitude of purchasing power available. Classification component 410 can compare the numeric value to threshold values associated with a class and identify the corresponding class.

The message component 420 is operable to receive, retrieve, obtain, acquire, or generate a message to be presented alone or in conjunction with purchasing power. In one instance, the message can be a recommendation produced by a recommendation component, such as to submit a payment to increase purchasing power. The message could be additional related information such as a current credit score, current location, average price of goods or services in the location, or the like.

The visualization component 430 is operable to generate a visualization that can be presented by a display device associated with a computing device such as augmented reality glasses, a smartphone, or a laptop computer. The visualization component 430 can adapt a graphic to reflect purchasing power class as identified by the classification component 410. For example, a traffic-signal type graphic could be generated that reflects good purchasing power by illuminating a green light rather than yellow or red. Alternatively, a gauge can be generated pointing to an area associated with purchasing power. Further, the visualization component can produce additional content such as a message, recommendation, or credit score for presentation. The additional content can be overlaid on a portion of a purchasing power graphic, be integrated within the graphic, or be located on the top, bottom, left, or right of the purchasing power graphic. Further, the additional content can be triggered by an action such as a gesture, selection, or activation. Once graphical content is generated or otherwise identified, the graphical content can be conveyed for display on a display device.

The presentation component 240 can generate more than a visual representation of purchasing power or other content. For instance, the presentation component 240 can communicate purchasing power and other content with sound or haptic feedback. By way of example, the classification can be spoken. Alternatively, a sound pattern can be played, in which three beeps represent a classification of good purchasing power while one beep denotes poor purchasing power. Similarly, three vibrations or other vibration patterns can represent good purchasing power versus poor.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Furthermore, one or more components and/or sub-components can be combined into a single component to provide aggregate functionality. Communication between systems, components, or sub-components can be accomplished following either a push or pull control model. The components can also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes, thereby making portions of the systems and methods more adaptive as well as efficient and intelligent. By way of example, and not limitation, the purchasing power system 120 and components thereof can employ such mechanisms to infer a dynamic spending limit, a recommendation, or both, among other things.

In view of the example systems described above, methods that can be implemented in accordance with the disclosed subject matter will be better appreciated with reference to flow chart diagrams of FIGS. 5-8. While, for purposes of simplicity of explanation, the methods show and describe a series of blocks, it is to be understood and appreciated that the disclosed subject matter is not limited by the order of the blocks, as some blocks can occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 5:
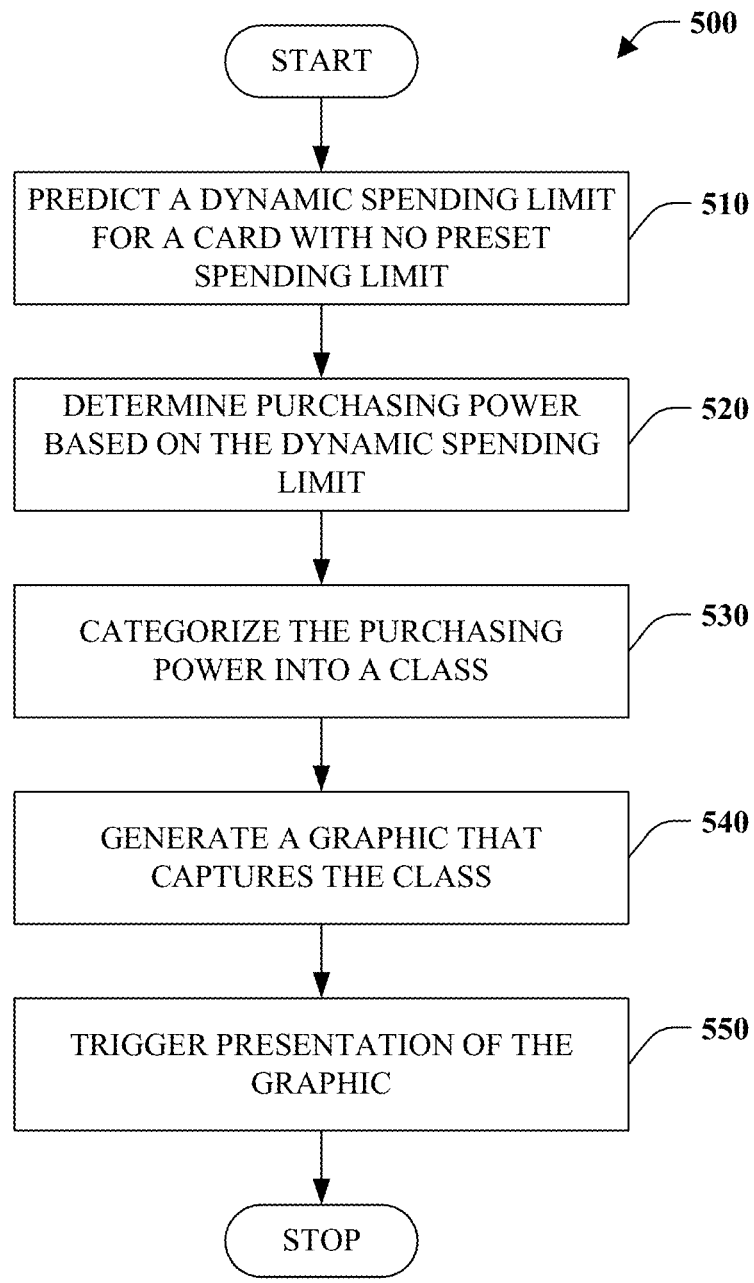
FIG. 5 is a flow chart diagram of a method of visualizing purchasing power.

Turning attention to FIG. 5, a flow chart diagram depicts a method 500 of visualizing purchasing power. The method can be performed by the purchasing power system 120 and components thereof.

At numeral 510, the method 500 predicts a dynamic spending limit for a payment card with no preset spending limit. The method 500 can predict the dynamic spending limit by invoking a machine learning model trained to infer a spending limit based on historical data that specifies spending limits and characteristics or features associated with the spending limits. Accordingly, the method 500 can invoke the machine learning model with characteristics associated with a cardholder or accountholder to determine the dynamic spending limit.

At reference 520, the method 500 determines purchasing power based on the dynamic spending limit predicted at numeral 510. Purchasing power can be defined as available credit, such that the purchasing power is equal to the difference between the dynamic spending limit and any outstanding balance. In other words, the method can receive, retrieve, or otherwise obtain or acquire the outstanding balance amount and subtract the outstanding balance amount from the dynamic spending limit to produce a numeric representation of purchasing power.

At numeral 530, the method 500 categorizes the purchasing power into one of a plurality of classes. Each of two or more classes can include threshold values to define the classes. Accordingly, the purchasing power can be classified into a class, group, bucket, or category based on comparing the numeric representation of purchasing power to the threshold values.

At reference 540, a graphic is generated that captures the identified class. For example, the graphic can be a traffic light with three classes corresponding to the colors green, yellow, and red. If the purchasing power class is green, the color green can be illuminated on the traffic light while the others remain unilluminated. In another instance, the graphic can be a gauge. In this situation, the gauge needle can point to a portion of a dial corresponding to the purchasing power class.

At reference numeral 550, presentation of the graphic is triggered on a computing device with a display. For example, the graphic can be provided to an augmented reality device and overlaid on the physical payment card. In other words, the graphic can be projected and positioned with respect to the physical payment card. For instance, the payment card can be detected in view of an augmented reality device such as augmented-reality glasses or a smartphone. In response, the graphic can be projected on or near (e.g., above, below, left, right) the payment card. Presentation can encompass visualization of the graphic alone or in combination with audio or tactile feedback, among other things.

Figure 6:
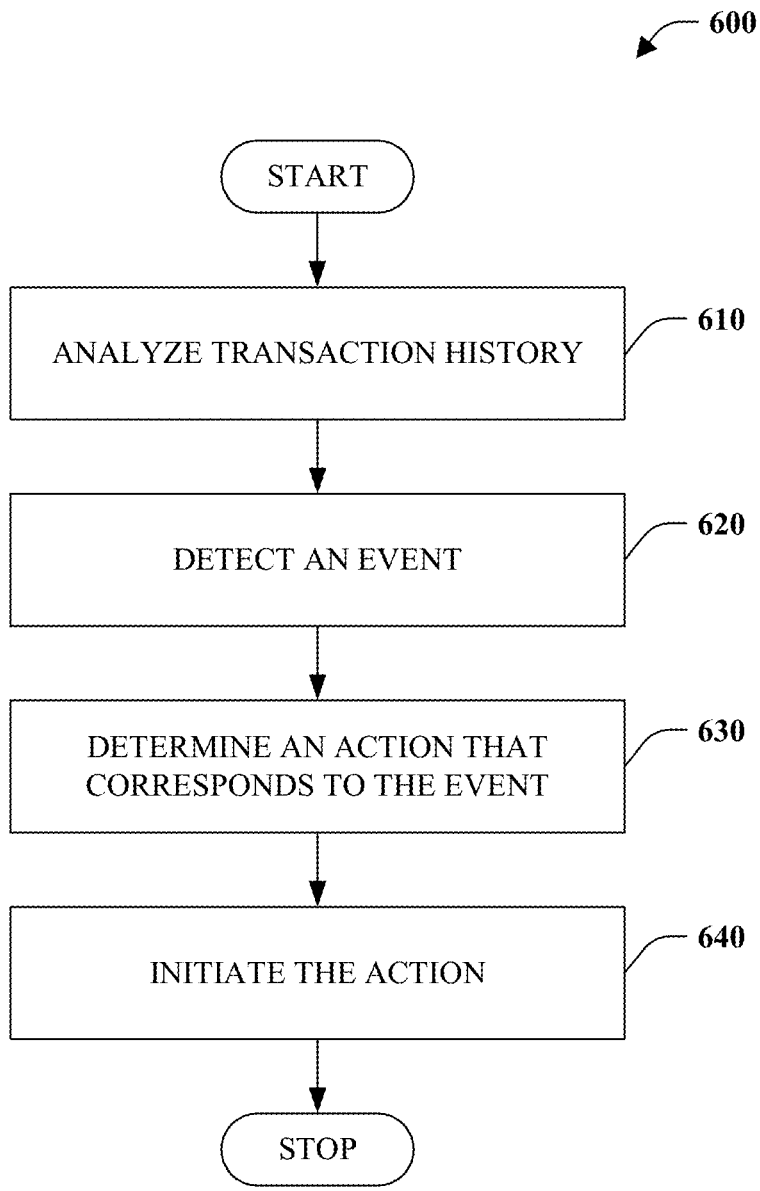
FIG. 6 is a flow chart diagram of an event response method.

FIG. 6 is a flow chart diagram of a method 600 of responding to events. The method can be implemented by the purchasing power system 120 and components thereof including the adjustment component 250.

At reference numeral 610, the method 600 receives, retrieves, or otherwise obtains or acquires transaction history. The transaction history is then analyzed. The analysis can focus on identifying patterns, such as changes in transaction number or amount over time or at particular times of the year.

At numeral 620, the method 600 detects an event. The event can be substantially any occurrence that is associated with transaction history. For example, the event can be personal or business related, such as the achievement of a milestone (e.g., number of years in business, income change). Another event can correspond to a holiday or situation significantly affecting business. Other events are also possible and contemplated. In accordance with one embodiment, a machine learning model can be trained and invoked to recognize one or more events.

At numeral 630, the method 600 determines an action to take in response to the event. The action can correspond to an increase or decrease in purchasing power. For example, purchasing power can be increased if a milestone is achieved concerning business growth. By contrast, if the event corresponds with the closing of a business or a significant reduction of business, the purchasing power can be decreased.

The method can initiate the action at numeral 640. Initiation can correspond to increasing or decreasing the purchasing power before presentation. Additionally, a message can be generated and presented identifying detection of an event that affects purchasing power.

Figure 7:
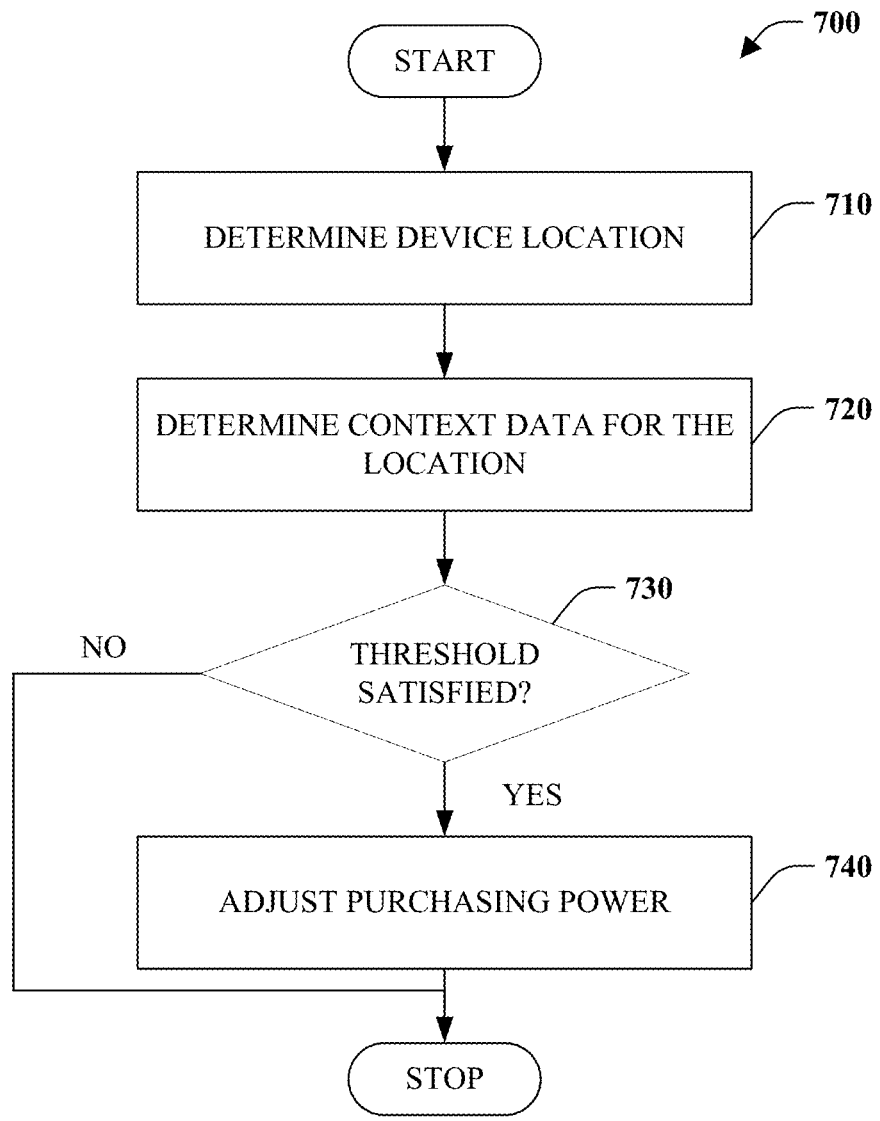
FIG. 7 is a flow chart diagram of a method of adjusting purchase power.

FIG. 7 is a flow chart diagram of a method 700 of adjusting purchasing power. The method 700 can be performed by the purchasing power system 120 and includes components, such as the adjustment component 250.

At numeral 710, the method 700 determines a location of a computing device of a cardholder. In one instance, the computing device can correspond to a smartphone. However, other computing devices are also contemplated including but not limited to augmented reality glasses and smartwatches. Various positioning systems and technology can be utilized to determine the location, including global positioning systems (GPS), proximity-based systems, WiFi-based systems, acoustic systems, and infrared (IR) systems, among others. In this manner, geographic as well as indoor locations can be determined.

At reference 720, the method 700 seeks to determine context data for an identified location. Context data can include the number, type, and average cost associated with merchants in a geographic location. Further, the context data can include the average cost within a particular store if detected. For example, the average cost at a car dealership is much more than an office supply store.

At numeral 730, the method 700 determines whether or not a threshold has been satisfied. The threshold can be a predetermined contextual value. For example, if the location is a car dealership, the threshold can be satisfied based on the average price of goods or services. If it is determined that a threshold is not satisfied ("NO"), the method 700 can simply terminate. However, if the method determines that the threshold is satisfied ("YES"), the method 700 can continue at reference numeral 740.

At reference numeral 740, the method 700 adjusts the purchasing power. Consider again, the example that a cardholder is located within a car dealership, and a check of purchasing power is initiated. In this instance, the purchasing power can be reduced based on context. In other words, the purchasing power is adjusted to account for the average purchase price of a vehicle. In this manner, the purchasing power is location and context adjusted.

Figure 8:
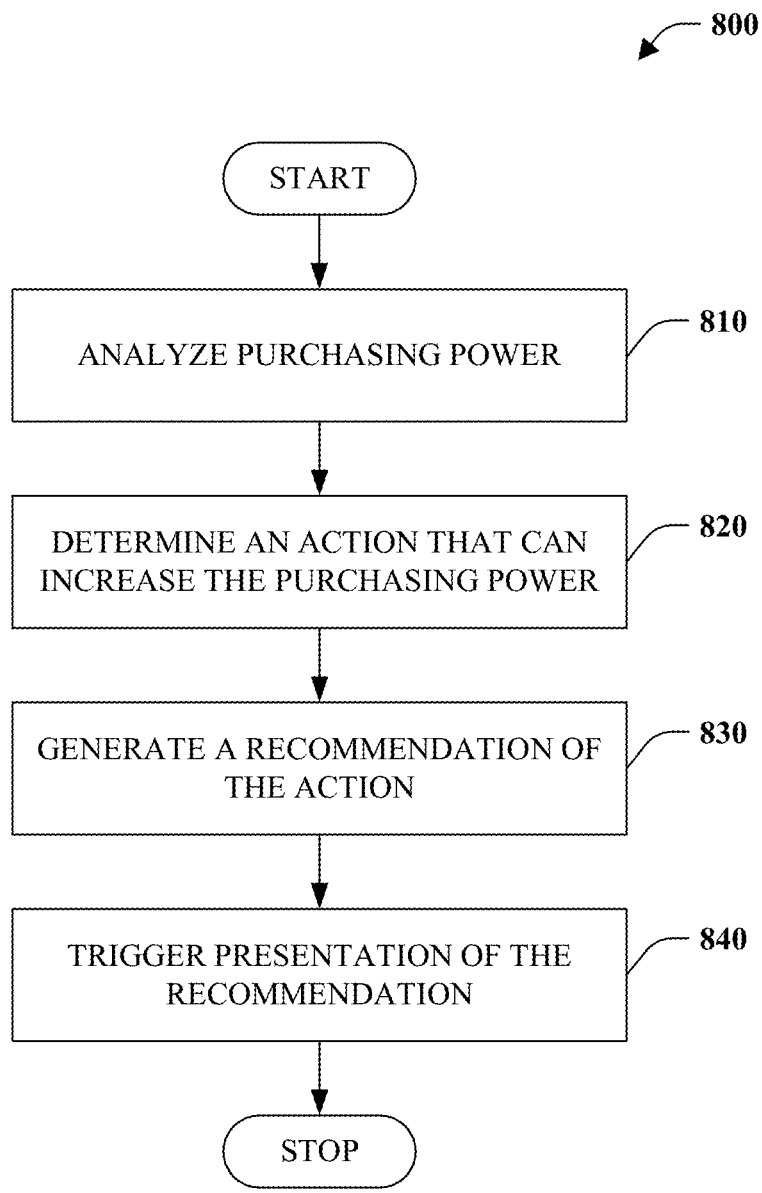
FIG. 8 is a flow chart diagram of a recommendation method.

FIG. 8 is a flow chart diagram of a method 800 of determining and making recommendations regarding purchasing power. The method 800 can be implemented by the purchasing power system 120 and components thereof including the recommendation component 260.

At reference numeral 810, the method 800 analyzes purchasing power. The analysis can involve factors that affect a spending limit and purchasing power derived from the spending limit. For example, a credit report or score can affect the extent of the spending limit. In another instance, an outstanding balance can proportionally reduce the purchasing power.

At numeral 820, the method 800 determines an action that can increase purchasing power. The action taken can seek to remedy issues determined as a result of the analysis. For example, if there is a past due amount and an outstanding balance, the corresponding action is to make a payment and pay down the outstanding balance to increase purchasing power. Similarly, if a high debt-to-credit ratio is determined from a credit report, the recommendation can be to pay down the debt.

Once an action is determined, the method 800 can generate a recommendation for the action at 830. Subsequently, the method can trigger presentation of the recommendation at 840. The recommendation format and presentation can vary. In one instance, the recommendation can appear as a message in conjunction with a graphic capturing purchasing power. Additionally, or alternatively, the method 800 can trigger presentation as a text message, application message, or email, depending on user preferences.

This disclosure pertains to the technical problem of determining and communicating purchasing power associated with electronic payment by way of a payment card. The technical solution is to generate and invoke a machine learning model for use in making predictions associated with determining purchasing power. A graphic can be generated or selected that captures purchasing power and can be projected in augmented reality relative to a physical payment card.

As used herein, the terms "component" and "system," as well as various forms thereof (e.g., components, systems, sub-systems . . . ) are intended to refer to a computer-related entity, either hardware, a combination of hardware and software, software, or software in execution. For example, a component can be but is not limited to being a process running on a processor, a processor, an object, an instance, an executable, a thread of execution, a program, and/or a computer. By way of illustration, both an application running on a computer and the computer can be a component. One or more components can reside within a process and/or thread of execution, and a component can be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference can be employed to identify a context or an action or may be used to generate a probability distribution over states, for example. An inference can be probabilistic. For example, computation of a probability distribution over states of interest can be based on a consideration of data or events. Inference can also refer to techniques employed for composing higher-level events from a set of events or data. Such inference can result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A' employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having," or variations in form thereof are used in either the detailed description or the claims, such terms are intended to be inclusive in a manner similar to the term "comprising" as "comprising" is interpreted when employed as a transitional word in a claim.

To provide a context for the disclosed subject matter, FIG. 10, as well as the following discussion, are intended to provide a brief, general description of a suitable environment in which various aspects of the disclosed subject matter can be implemented. However, the suitable environment is solely an example and is not intended to suggest any limitation on the scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, and data structures, among other things, which perform particular tasks and/or implement particular abstract data types. Moreover, those skilled in the art will appreciate that the above systems and methods can be practiced with various computer system configurations, including single-processor, multi-processor, or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all, aspects of the disclosed subject matter can be practiced on standalone computers. In a distributed computing environment, program modules can be located in one or both of local and remote memory devices.

Figure 9:
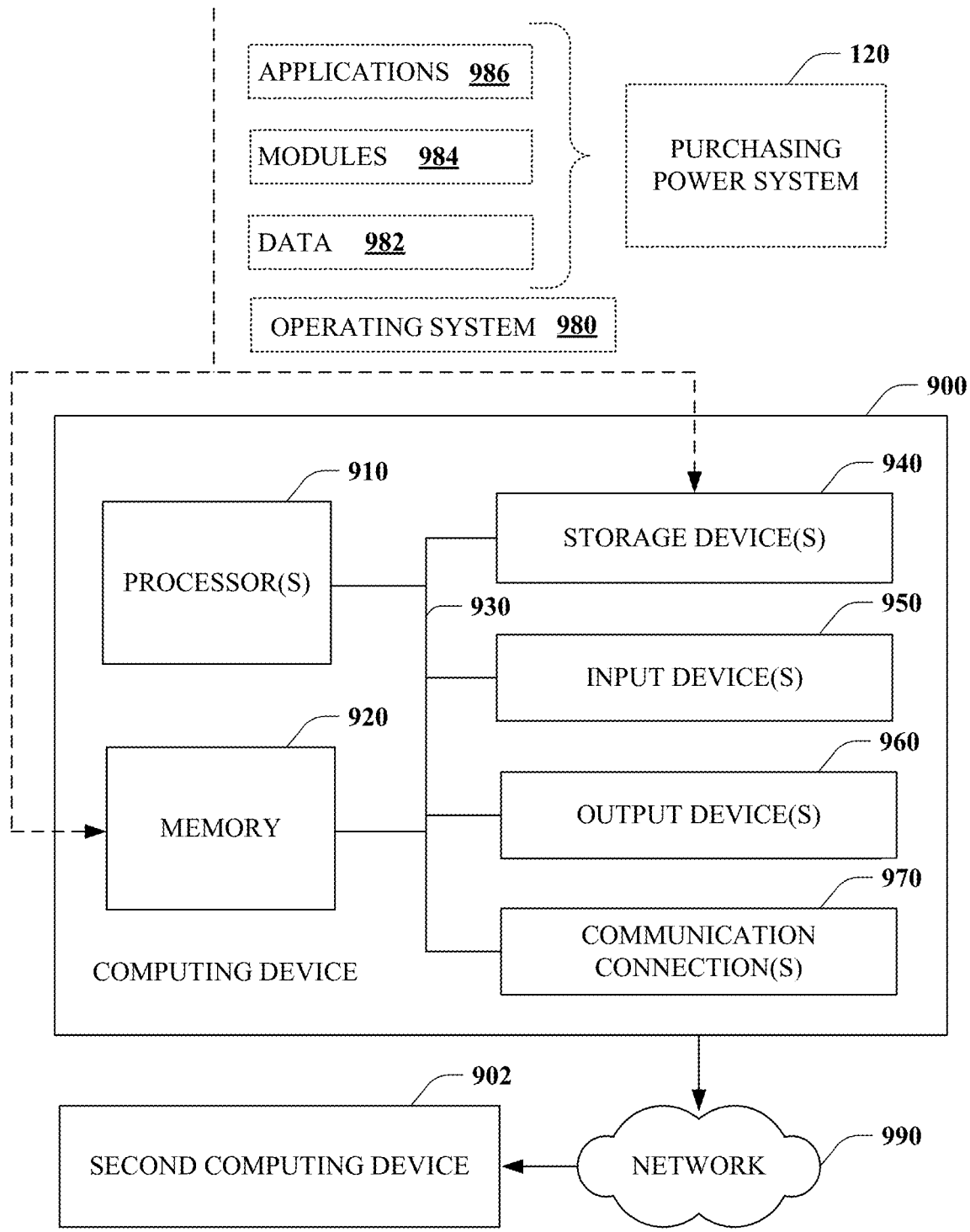
FIG. 9 is a block diagram illustrating a suitable operating environment for aspects of the subject disclosure.

With reference to FIG. 9, illustrated is an example computing device 900 (e.g., desktop, laptop, tablet, watch, server, hand-held, programmable consumer or industrial electronics, set-top box, game system, compute node). The computing device 900 includes one or more processor(s) 910, memory 920, system bus 930, storage device(s) 940, input device(s) 950, output device(s) 960, and communications connection(s) 970. The system bus 930 communicatively couples at least the above system constituents. However, the computing device 900, in its simplest form, can include one or more processors 910 coupled to memory 920, wherein the one or more processors 910 execute various computer-executable actions, instructions, and or components stored in the memory 920.

The processor(s) 910 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. The processor(s) 910 can also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 910 can be a graphics processor unit (GPU) that performs calculations concerning digital image processing and computer graphics.

The computing device 900 can include or otherwise interact with a variety of computer-readable media to facilitate control of the computing device to implement one or more aspects of the disclosed subject matter. The computer-readable media can be any available media accessible to the computing device 900 and includes volatile and nonvolatile media, and removable and non-removable media. Computer-readable media can comprise two distinct and mutually exclusive types: storage media and communication media.

Storage media includes volatile and nonvolatile, removable and non-removable media implemented in any method or technology to store information such as computer-readable instructions, data structures, program modules, or other data. Storage media includes storage devices such as memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD) . . . ), and solid-state devices (e.g., solid-state drive (SSD), flash memory drive (e.g., card, stick, key drive)), or any other like mediums that store, as opposed to transmit or communicate, the desired information accessible by the computing device 900. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 920 and storage device(s) 940 are examples of computer-readable storage media. Depending on the configuration and type of computing device, the memory 920 can be volatile (e.g., random access memory (RAM)), nonvolatile (e.g., read-only memory (ROM), flash memory . . . ), or some combination of the two. By way of example, the basic input/output system (BIOS), including basic routines to transfer information between elements within the computing device 900, such as during start-up, can be stored in nonvolatile memory, while volatile memory can act as external cache memory to facilitate processing by the processor(s) 910, among other things.

The storage device(s) 940 include removable/non-removable, volatile/nonvolatile storage media for storing vast amounts of data relative to the memory 920. For example, storage device(s) 940 include, but are not limited to, one or more devices such as a magnetic or optical disk drive, floppy disk drive, flash memory, solid-state drive, or memory stick.

Memory 920 and storage device(s) 940 can include, or have stored therein, operating system 980, one or more applications 986, one or more program modules 984, and data 982. The operating system 980 acts to control and allocate resources of the computing device 900. Applications 986 include one or both of system and application software and can exploit management of resources by the operating system 980 through program modules 984 and data 982 stored in the memory 920 and/or storage device(s) 940 to perform one or more actions. Accordingly, applications 986 can turn a general-purpose computer 900 into a specialized machine according to the logic provided.

All or portions of the disclosed subject matter can be implemented using standard programming and/or engineering techniques to produce software, firmware, hardware, or any combination thereof to control the computing device 900 to realize the disclosed functionality. By way of example and not limitation, all or portions of the purchasing power system 120 can be, or form part of, the application 986, and include one or more modules 984 and data 982 stored in memory and/or storage device(s) 940 whose functionality can be realized when executed by one or more processor(s) 910.

In accordance with one particular embodiment, the processor(s) 910 can correspond to a system on a chip (SOC) or like architecture including, or in other words integrating, both hardware and software on a single integrated circuit substrate. Here, the processor(s) 910 can include one or more processors as well as memory at least similar to the processor(s) 910 and memory 920, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the purchasing power system 120 and/or functionality associated therewith can be embedded within hardware in a SOC architecture.

The input device(s) 950 and output device(s) 960 can be communicatively coupled to the computing device 900. By way of example, the input device(s) 950 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 960, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 950 and output device(s) 960 can be connected to the computing device 900 by way of wired connection (e.g., bus), wireless connection (e.g., Wi-Fi, Bluetooth), or a combination thereof.

The computing device 900 can also include communication connection(s) 970 to enable communication with at least a second computing device 902 utilizing a network 990. The communication connection(s) 970 can include wired or wireless communication mechanisms to support network communication. The network 990 can correspond to a personal area network (PAN), local area network (LAN), or a wide area network (WAN) such as the internet. In one instance, the computing device 900 can correspond to a server executing the purchasing power system 120. The second computing device 902 can correspond to a user computing device such as a smartphone, augmented reality glasses, or both. In this instance, the purchasing power system 120 is operating as a service that is accessible by other computing devices. In another instance, the computing device 900 can correspond to a user computing device that executes at least a portion of the purchasing power system 120 locally and makes calls to a server corresponding to the second computing device for additional functionality or data.

What has been described above includes examples of aspects of the claimed subject matter. It is, of course, not possible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system comprising:
one or more processors and memory that stores instructions that, when executed by the one or more processors, cause the one or more processors to:
predict, based on one or more of card account data or credit report data associated with a card account that has no preset spending limit, a dynamic spending limit using a machine learning model trained on one or more of historical card data or historical credit report data;
compute purchasing power as a difference between the dynamic spending limit and a current balance of the card account;
identify a purchasing power class based on the purchasing power; and
in connection with a user action, trigger augmented reality presentation of a graphic representation associated with the purchasing power class overlaid on a physical card associated with the card account.

2. The system of claim 1, wherein the augmented reality presentation comprises a presentation of at least a subset of the credit report data.

3. The system of claim 1, wherein the instructions further cause the one or more processors to:
identify a purchase context based on a location of a user of the physical card; and
identify the purchasing power class based on the purchasing power and the purchase context.

4. The system of claim 1, wherein the instructions further cause the one or more processors to:
identify a purchase context based on a location of a user of the physical card;
determine an average cost of a product or service based on the purchase context; and
compute an impact of a purchase of the average cost on the credit report data,
wherein triggering the augmented reality presentation comprises triggering the augmented reality presentation of the impact with the graphic representation overlaid on the physical card.

5. The system of claim 1, wherein the instructions further cause the one or more processors to:
analyze one or more factors associated with the purchasing power class;
determine a change to the one or more factors that increases purchasing power; and
triggering display of a message including the change as a recommendation.

6. The system of claim 1, wherein triggering the augmented reality presentation comprises triggering, via augmented reality glasses, the augmented reality presentation of the graphic representation associated with the purchasing power class.

7. The system of claim 1, wherein identifying the purchasing power class comprises identifying the purchasing power class from a classification set that includes a plurality of purchasing power classes respectively corresponding to a green traffic light, a yellow traffic light, and a red traffic light, and wherein the graphic representation comprises a color traffic light having a green, yellow, or red color.

8. The system of claim 1, wherein the graphic representation comprises a bar graph.

9. A method, comprising:
executing, on one or more processors, instructions that cause the one or more processors to perform operations, the operations comprising:
predicting, based on one or more of card account data or credit report data associated with a card account that has no preset spending limit, a dynamic spending limit using a machine learning model trained on one or more of historical card data or historical credit report data;
computing purchasing power as a difference between the dynamic spending limit and a current balance of the card account;
identifying a purchasing power class based on the purchasing power; and
in connection with a user action, triggering augmented reality presentation of a graphic representation associated with the purchasing power class overlaid on a physical card associated with the card account.

10. The method of claim 9, wherein the operations further comprise:
identifying a purchase context based on a location of a user of the physical card; and adjusting the purchasing power based on the purchase context.

11. The method of claim 9, wherein the operations further comprise:
identifying a purchase context based on a location of a user of the physical card;
determining an average cost of a product or service based on the purchase context; and
computing an impact of a purchase of the average cost on the credit report data,
wherein triggering the augmented reality presentation comprises triggering the augmented reality presentation of the impact with the graphic representation on the physical card.

12. The method of claim 9, wherein the operations further comprise:
inferring, via at least one machine learning model, an event based on transaction history associated with the card account; and
adjusting the purchasing power based on the event.

13. The method of claim 9, wherein the operations further comprise:
analyzing one or more factors associated with purchasing power classification;
determining a change to the one or more factors that increases the purchasing power; and
triggering display of a message including the change as a recommendation.

14. The method of claim 9, wherein the operations further comprise configuring the graphic representation by activating at least one of green, yellow, or red on a traffic light based on one or more thresholds associated with the purchasing power.

15. One or more non-transitory computer-readable media storing instructions that, when executed by one or more processors, cause operations comprising:
predicting, based on one or more of card account data or credit report data associated with a card account that has no preset spending limit, a dynamic spending limit using a machine learning model trained on one or more of historical card data or historical credit report data;
computing purchasing power as a difference between the dynamic spending limit and a current balance of the card account;
identifying a purchasing power class based on the purchasing power; and
in connection with a user action, triggering augmented reality presentation of a graphic representation associated with the purchasing power class overlaid on a physical card associated with the card account.

16. The one or more non-transitory computer-readable media of claim 15, wherein triggering the augmented reality presentation comprises triggering, via a head-mounted display, the augmented reality presentation of the graphic representation associated with the purchasing power class.

17. The one or more non-transitory computer-readable media of claim 15, wherein identifying the purchasing power class comprises identifying the purchasing power class from a classification set that includes a plurality of purchasing power classes respectively corresponding to a green traffic light, a yellow traffic light, and a red traffic light, and wherein the graphic representation comprises a color traffic light having at least a green, yellow, or red color.

18. The one or more non-transitory computer-readable media of claim 15, the operations further comprising:
inferring, via at least one machine learning model, an event based on transaction history associated with the card account; and
adjusting the purchasing power based on the event.

19. The one or more non-transitory computer-readable media of claim 15, wherein predicting the dynamic spending limit comprises predicting, based on the card account data associated with the card account, the dynamic spending limit using the machine learning model.

20. The one or more non-transitory computer-readable media of claim 15, wherein predicting the dynamic spending limit comprises predicting, based on the credit report data associated with the card account, the dynamic spending limit using the machine learning model.

* * * * *